United States Patent
Ellis et al.

[11] Patent Number: 5,325,681
[45] Date of Patent: Jul. 5, 1994

[54] AIR CONDITIONING SYSTEM

[76] Inventors: Stanley C. Ellis, 4918 W. Joyce Cir., Glendale, Ariz. 85308; Richard L. Jeanblanc, 3526 W. Danbury, Glendale, Ariz. 85308

[21] Appl. No.: 65,397

[22] Filed: May 24, 1993

[51] Int. Cl.[5] .................................. F28D 5/00
[52] U.S. Cl. ............................. 62/314; 62/332; 62/DIG. 16
[58] Field of Search ......... 62/304, 315, 332, DIG. 16, 62/314

[56] References Cited

U.S. PATENT DOCUMENTS

| | | | |
|---|---|---|---|
| 2,018,453 | 10/1935 | Lawler | 62/129 |
| 2,030,032 | 2/1936 | Keyes | 62/129 |
| 3,182,718 | 5/1965 | Goettl | 165/60 |
| 3,859,818 | 1/1975 | Goettl | 62/311 |
| 4,043,777 | 8/1977 | Parren | 62/315 X |
| 4,204,409 | 5/1980 | Satama | 62/271 |
| 4,284,128 | 8/1981 | Nelson | 62/315 X |
| 4,351,163 | 9/1982 | Johannsen | 62/305 |
| 4,362,091 | 12/1982 | Cox | 62/314 X |
| 4,505,327 | 3/1985 | Angle et al. | 165/48 |
| 4,698,979 | 10/1987 | McGuigan | 62/171 |
| 4,803,849 | 2/1989 | Diaz | 62/311 |

Primary Examiner—William E. Tapoicai
Attorney, Agent, or Firm—Warren F. B. Lindsley

[57] ABSTRACT

An air conditioning system employing an air conditioning unit the conditioned air of which is obtained from an associated evaporative cooler under the influence only of the refrigeration unit's fan or blower.

5 Claims, 1 Drawing Sheet

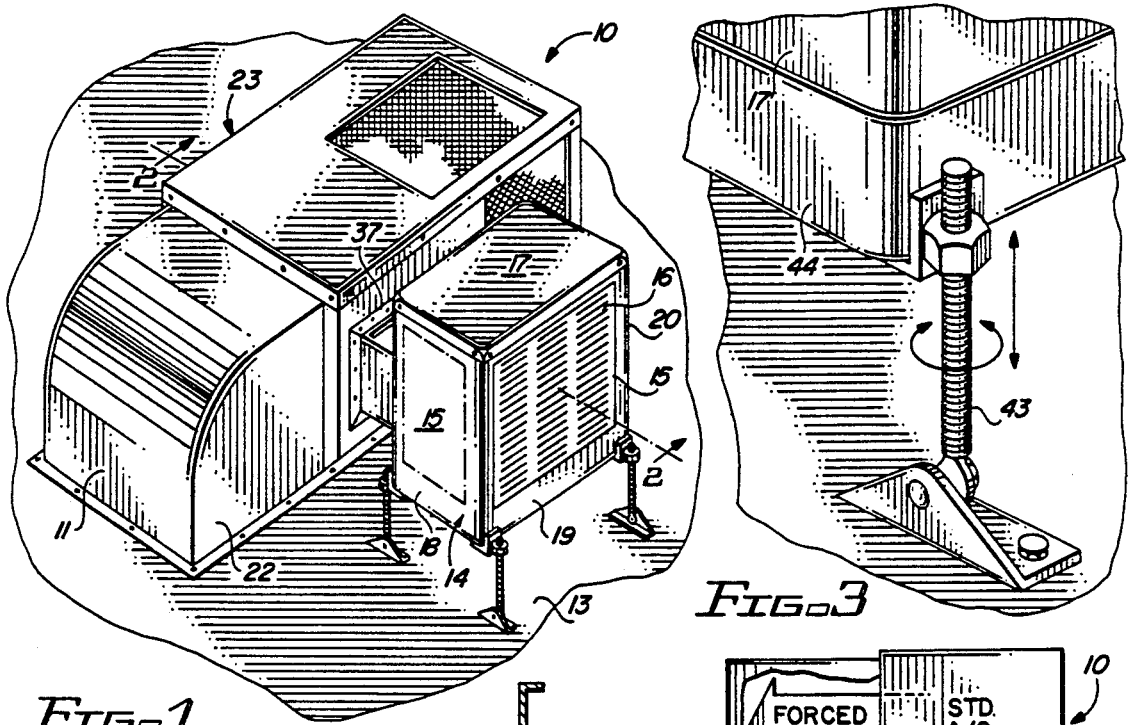
FIG. 1
FIG. 3
FIG. 4
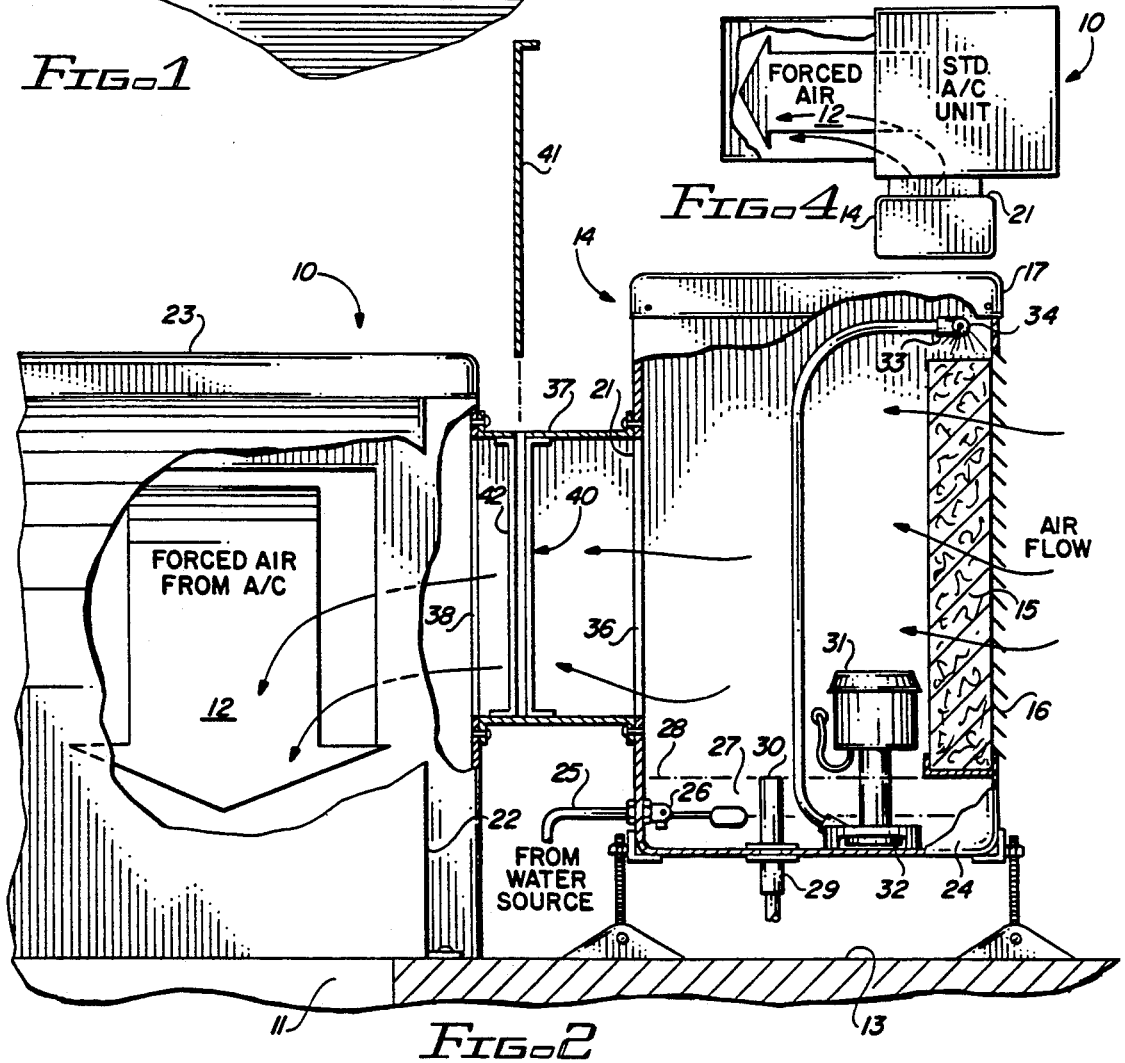
FIG. 2

AIR CONDITIONING SYSTEM

BACKGROUND OF THE INVENTION

With the advent of higher energy costs, the evaporative cooler as part of an air conditioning system is again assuming prominence in the marketplace. Its installation and operating costs are more economical than a refrigeration unit and even where a refrigeration system is needed, the trend is now to utilize both types working together to provide an air conditioning system.

While the cost of operating an evaporative cooling system is considerably less expensive than that of a mechanical refrigeration system incorporating compressors and condensers, further improvements in the effectiveness and efficiency of an air conditioning system is economically desirable. The present invention provides a means for enhancing the cooling efficiency of existing air conditioning systems by merely using a single blower for moving refrigerated air or evaporatively cooled air to a point or area of use by means of a compact unitary system.

Heretofore, air conditioning systems which operationally utilize evaporative and refrigerated cooling usually employ at least two blowers and rather complex ducting or air flow controlling devices. Accordingly, such previous systems have been relatively complicated and expensive, both form the initial and operational standpoints.

In the installation of air conditioning equipment it has been a problem to provide a common unit which affords the convenience of an evaporative and/or a refrigeration cooler. Ordinarily such dual functioning equipment has imposed the necessity of making structural changes in the system after an installation has been initially made. Such changes are usually of a difficult and expensive nature, and ordinarily involve the addition of additional air moving blowers, to deliver the conditioned air to a point of use. This being necessary because the usual evaporative cooler requires an air delivery blower, and the refrigeration cooling system may require another, or separate blower for the delivery of conditioned air to the interior of a building, room or point of use.

DESCRIPTION OF THE PRIOR ART

Numerous improvements in air conditioning systems have been conceived; however, more are needed for it to function effectively under all operating conditions.

U.S. Pat. No. 4,803,849 discloses an evaporative cooler which may be installed as an add-on to a preexisting refrigeration type air conditioning unit. A separate blower is used for each unit. A damper automatically operates to select refrigerated or evaporatively cooled air.

U.S. Pat. No. 3,182,718 discloses an air conditioning system in which refrigerated air, evaporatively cooled air or heated air may be moved to a point of use by a single blower.

U.S. Pat. No. 3,859,818 discloses a unitary assembly of a refrigeration air conditioner and an evaporative cooler.

Other patents of general interest in the evaporative cooling art are listed below:

| | |
|---|---|
| 4,698,979 | 4,204,409 |
| 4,505,327 | 2,030,032 |
| 4,351,163 | 2,018,453 |

None of the known patents disclose the improved air conditioning system disclosed and claimed herein:

SUMMARY OF THE INVENTION

In accordance with the invention claimed, an auxiliary evaporative cooler shell is provided for use in the enhancement of the operation of an existing refrigeration cooling system. The auxiliary cooler shell comprises a framework carrying evaporator pads on as many as three sides with provision for water distribution to the pads. The shell is intended to be placed adjacent an existing refrigeration unit which shares with the existing cooler its air moving system.

It is, therefore, one object of the present invention to provide a very simple air conditioning system employing both refrigeration and evaporation cooler functions but employing only one blower for use in delivering conditioned air to the interior of a room or a point of use, said blower being a part of the air conditioning refrigeration system.

Another object of this invention is to provide a very simple air conditioning system having a single blower and novel blower housing and casing means together with an air flow controlling device which provides very simple control of the optional delivery of evaporatively cooled air to the interior of a room or a use location through the refrigeration air conditioning unit.

A further object of this invention is to provide an air conditioning system employing a single blower to deliver evaporatively cooled air and employing a novel air flow controlling means which selectively delivers evaporatively cooled air to the refrigeration system.

A still further object of this invention is to provide a novel air conditioning system wherein a single blower is disposed to selectively deliver evaporatively cooled air to an air impelling means.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described with reference to the accompanying drawing, in which:

FIG. 1 is a perspective view of a refrigeration air cooling system in combination with an evaporation cooler housing and embodying the invention;

FIG. 2 is a cross sectional view of FIG. 1 taken along the line 2—2;

FIG. 3 is a partial perspective view of one of the leg adjustment means of the support of the evaporative cooler housing; and FIG. 4 is a block diagram showing the air flow of the combined refrigeration/cooler system employing a single blower means.

DESCRIPTION OF THE PREFERRED EMBODIMENT

Referring more particularly to the drawing by characters of reference, FIGS. 1 and 2 illustrate a diagrammatic perspective view of a conventional preexisting air conditioning unit which may be either a heater, refrigeration unit or a combination thereof of the type with which a preferred embodiment of the invention may be used. As shown, refrigeration unit 10 constitutes conventional heat exchange parts (not shown) including a compressor, condenser, expansion valve, evaporator and appropriate air flow duct work. The unit 10 also typically includes a fan or other means for cooling the condenser coil. Since any mechanical refrigeration unit 10 of the types commonly employed may be used for unit 10, no details of the structure of that unit are illustrated.

For the purposes of understanding the preferred embodiment of this invention, it should be noted that cooled air passing through the evaporator of the refrigeration unit 10 is supplied through a supply duct 11 to an area of use. Similarly, return air from the space to be cooled may be supplied from that space back to unit 10 through a return duct (not shown). The refrigeration unit 10 includes a blower or fan 12 (diagrammatically shown) for constantly recirculating this air to pull the warmed air from the housing space into the unit through the return duct, pass that air over the evaporator or through the evaporator, and then discharge the cooled air back into the space to be cooled through the supply duct 11. Units of the type illustrated as unit 10 typically are mounted on the roof 12 of a building, with the elbow portions of duct 11 exposed as illustrated.

For units of the general configuration shown, the invention proposes adding an evaporative cooler, without in any way altering the conventional operation of the refrigeration unit 10. The evaporative cooler 14 is mounted in the area where duct 11 normally extends through roof 13 of the building. The evaporative cooler may be any conventional type of evaporative cooler-rated to the capacity of the refrigeration unit, typically having water saturated cooling pads 15 located on three sides with air inlets or louvers 16 to permit air to be drawn from the surrounding atmosphere through the pads and discharged into the building. Cooler 14 may be a flow through or recirculating type.

The evaporative cooler 14 is provided with a housing 17 having three sides 18, 19 and 20 in which respective evaporative cooler pads 15 are mounted. These are substantially conventional evaporative cooler pad assemblies. The evaporative cooler housing 17 comprises a fourth side 21 which is contiguous with the substantially upright side 22 of the refrigeration air conditioner 10.

The evaporative cooler 14 lacks a fan or blower of the conventional centrifugal type which would normally provide an air stream out of the cooler. A bottom or lower portion of the evaporative cooler 14 is provided with a sump pan 24.

Water is supplied to sump pan 24 through a domestic water supply line 25 under the control of a float type valve assembly 26. The valve assembly is operative to maintain the level of water 27 in the sump to level 28 shown. The sump pan 24 includes an overflow drain outlet 29 for draining excess water 27 from the sump pan when the water level reaches the top 30 of outlet 29. An electric motor 31 and pump 32 furnishing water to a manifold 33 extending across the top of pads 15 which includes a plurality of outlets 34 for discharging water down on the top of the vertically disposed pads 15. As water is discharged from the outlets 34 onto pads 15, the water flows downwardly through pads 15 and any excess water falls from the bottom of the pad down into sump pan 24.

The foregoing comprises a description of a conventional form of evaporative cooler assembly minus its squirrel cage blower assembly.

As noted from FIGS. 1 and 2 of the drawing, the fourth side 21 of the blower housing 17 is provided with an opening 36 that is surrounded by a transition collar 37 that engage and cover an opening 38 in housing 23 of the refrigeration unit 10.

Upon rotation of fan 12 of refrigeration unit 10, cool air drawn through pads 15 of the evaporation unit 14 travels from the interior of housing 17 through collar 37 into the refrigeration unit 10 and then driven or pushed into the area of the building being cooled.

In order to isolate the evaporation unit 14 from the refrigeration unit 10, a damper 40 is provided in collar 37 the blade 41 of which may be moved into and out of an apertured ring shaped housing 42 for selectively admitting or blocking the air flow from evaporation unit 14 through collar 37 and into the refrigeration unit under the control of its fan or blower 12. It should be noted that the return inlet of the refrigeration unit (not shown) is blocked during use of the evaporative cooler.

FIG. 3 discloses a threaded bolt 43 for adjustably positioning a rack 44 which supports housing 17 of the evaporative cooler 14 on roof 13 of a building.

FIG. 4 diagrammatically illustrates the air flow from evaporative cooler 14 into the refrigeration unit 10 under the influence of the refrigeration's blower or fan.

Thus, an air conditioning system is disclosed that employs merely the housing of an evaporative cooler and its moist controlled pad assembly for selectively furnishing cooled air to the blower assembly of a refrigeration unit.

Although but one embodiment of the present invention has been illustrated and described, it will be apparent to those skilled in the art that various changes and modifications may be made therein without departing from the spirit of the invention or from the scope of the appended claims.

What is claimed is:

1. A compact air conditioning system comprising:
    an air conditioner having a first duct means connecting said air conditioner to a point of use,
    an evaporative cooler comprising a housing having at least one moistened pad mounted therein for cooling atmospheric air upon it passing therethrough,
    a second duct means for connecting the hollow interior of said housing with said first duct means,
    blower means for forcing conditioned air from said air conditioner through said first duct means and for drawing atmospheric air through said pad, said second duct means and into said first duct means for movement to the point of use,
    and damper means mounted in said second duct means for selectively admitting and/or blocking the air flowing therethrough from said evaporative cooler.

2. The compact air conditioning system set forth in claim 1 wherein:
    said air conditioner comprises a refrigeration unit.

3. The compact air conditioning system set forth in claim 2 wherein said second duct means comprises a collar connecting said housing and said first duct means.

4. The compact air conditioning system set forth in claim 3 wherein:
    said damper means comprises a blade for penetrating said collar to block said duct means for controlling air flow therethrough.

5. The compact air conditioning system set forth in claim 1 wherein the blower means is a blower mounted in said air conditioner.

* * * * *